United States Patent [19]
Klees

[11] 3,836,188
[45] Sept. 17, 1974

[54] VEHICLE BUMPER SYSTEM
[75] Inventor: Gerard T. Klees, Rochester, Mich.
[73] Assignee: General Motors Corporation, Detroit, Mich.
[22] Filed: Apr. 25, 1973
[21] Appl. No.: 354,311

[52] U.S. Cl.......................... 293/88, 293/63, 293/95
[51] Int. Cl............................................ B60r 19/06
[58] Field of Search............... 293/1, 60, 62, 63, 70, 293/71 R, 88, 95, 97, 99; 267/116, 139, 140; 296/28 R, 31 P

[56] References Cited
UNITED STATES PATENTS

| | | | |
|---|---|---|---|
| 1,510,986 | 10/1924 | Fageol | 293/60 |
| 1,588,678 | 6/1926 | Gstalder | 293/62 |
| 3,173,717 | 3/1965 | Peras | 293/63 |
| 3,694,018 | 9/1972 | Levering | 293/88 |

Primary Examiner—M. Henson Wood, Jr.
Assistant Examiner—Robert Saifer
Attorney, Agent, or Firm—Saul Schwartz

[57] ABSTRACT

A bumper system particularly adapted for automobile type vehicles and including a face bar assembly supported on the body of the vehicle for fore and aft movement and defining a plurality of bearing surfaces, a plurality of reaction surfaces on the body of the vehicle, a similar reaction surface on the frame of the vehicle, and a plurality of energy absorbing modules disposed between respective pairs of bearings and reaction surfaces, the modules being fabricated from cellular plastic foam adapted for crush or collapse in an energy absorbing mode so that a portion of the kinetic energy of an impact on the face bar assembly is absorbed by the modules while the remainder of the impact load is distributed in predetermined proportion between the body and the frame of the vehicle.

2 Claims, 5 Drawing Figures

PATENTED SEP 17 1974 3,836,188

PATENTED SEP 17 1974 3,836,188

VEHICLE BUMPER SYSTEM

This invention relates generally to collison bumper systems for automotive vehicles and more particularly to a system wherein an impact force on a face bar portion of the system is distributed between the body and the frame of the vehicle.

The primary feature of this invention is that it provides an improved collision bumper system particularly adapted for automobile type vehicles. Another feature of this invention is that it provides an improved collision bumper system wherein impact forces on a face bar portion of the system are distributed between the body of the vehicle and the frame of the vehicle. Yet another feature of this invention resides in the provision of an improved collision bumper system including a face bar assembly, a first energy absorbing medium between the face bar assembly and the body of the vehicle, and a second energy absorbing medium between the face bar assembly and the frame of the vehicle, the energy absorbing mediums being adapted for controlled displacement in energy absorbing modes to dissipate some of the kinetic energy of impact while distributing the remainder of the impact force between the body and the frame of the vehicle. A further feature of this invention resides in the provision of first and second energy absorbing mediums in the form of energy absorbing modules fabricated from a cellular plastic material which is economical to manufacture and which provides relatively large bearing surfaces for distributing the force of impact over a maximum area, the walls of the individual cells of each module being adapted for energy absorbing plastic deformation when the module is subjected to compressive loading as would occur upon impact on the face bar assembly.

These and other features of this invention will be readily apparent from the following specification and from the drawings wherein.

Figure 1:
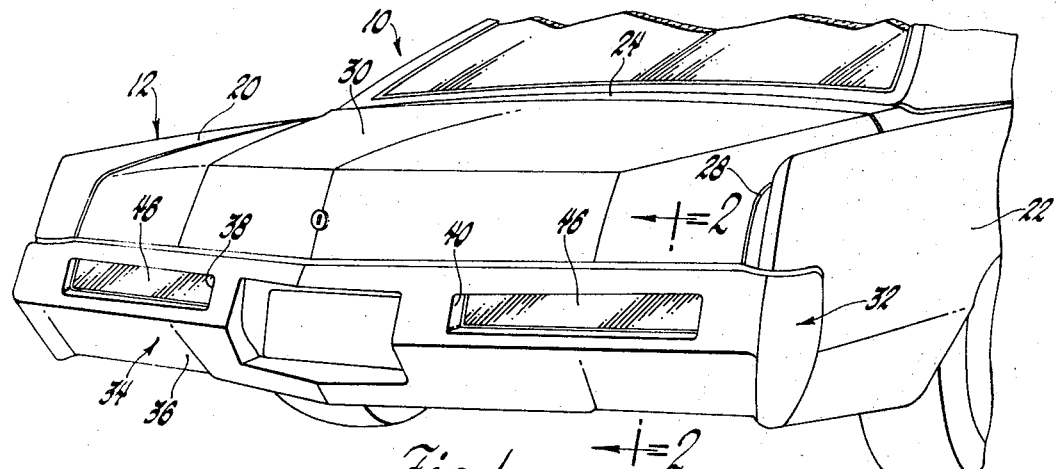
FIG. 1 is a fragmentary perspective view of the rear portion of an automobile type vehicle having thereon a bumper system according to this invention.

Referring now to the drawings, FIG. 1 depicts the rear section of an automobile type vehicle designated generally 10 including a body portion 12. The body portion is attached to a frame portion 14 of the vehicle, FIG. 2, through conventional resilient body mounts, not shown. The frame portion 14 includes a pair of spaced, longitudinally extending side rails, only one side rail 16 being shown in FIG. 2, and a transverse brace 18 interconnecting the side rails at the rear of the vehicle. The body portion 12 includes a left rear quarter panel assembly 20 and a right rear quarter panel assembly 22. The quarter panel assemblies are interconnected generally at the belt line of the vehicle by a horizontal sill 24 and, substantially below the belt line, by a vertical panel 26, FIG. 2. The quarter panel assemblies, the sill 24, and the vertical panel 26 cooperate in defining a luggage or cargo compartment, access to the compartment being through an opening 28 closed by a deck lid 30 hinged to the body portion adjacent the sill 24. Rearward of the vertical panel 26 the vehicle 10 includes a collision bumper system according to this invention designated generally 32 adapted to protect the rear section of the vehicle against collision damage.

Figure 2:
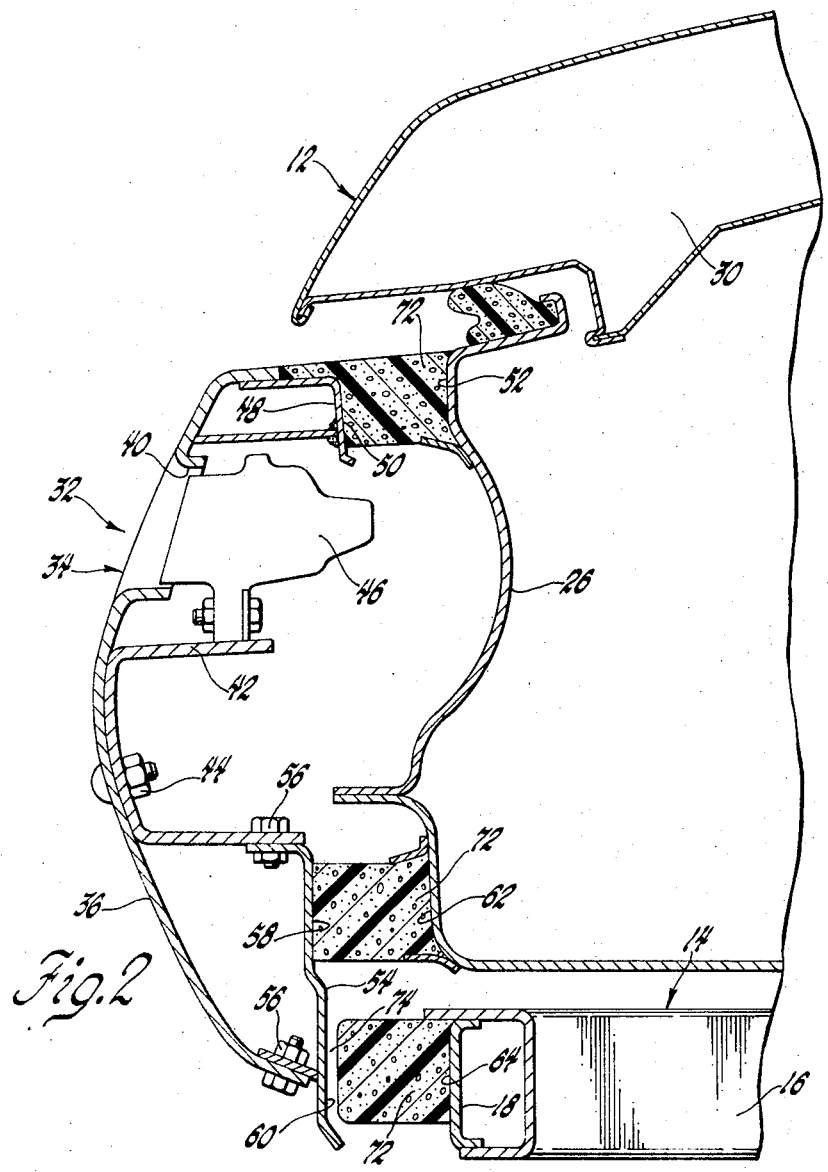
FIG. 2 is an enlarged sectional view taken generally along the plane indicated by lines 2—2 in FIG. 1.
Figure 3:
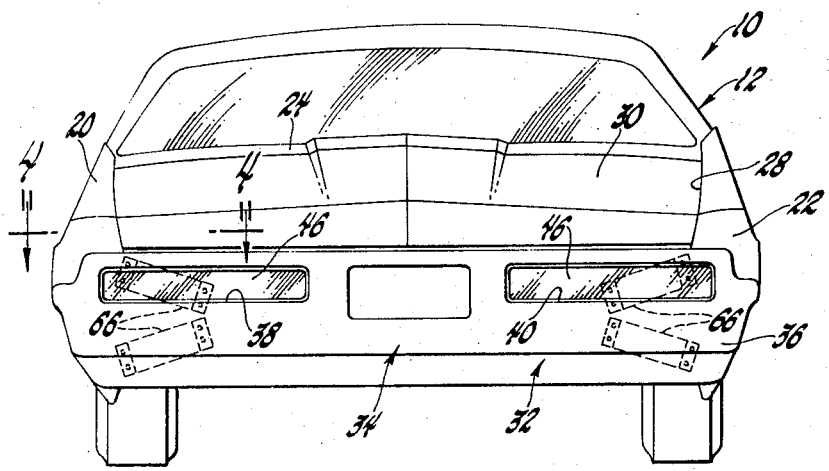
FIG. 3 is a rear elevational view of the vehicle.
Figure 4:
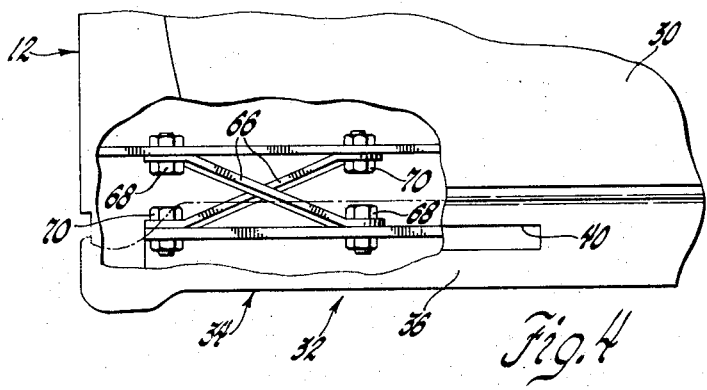
FIG. 4 is a fragmentary, partially broken away view taken generally along the plane indicated by lines 4—4 in FIG. 3.
Figure 5:
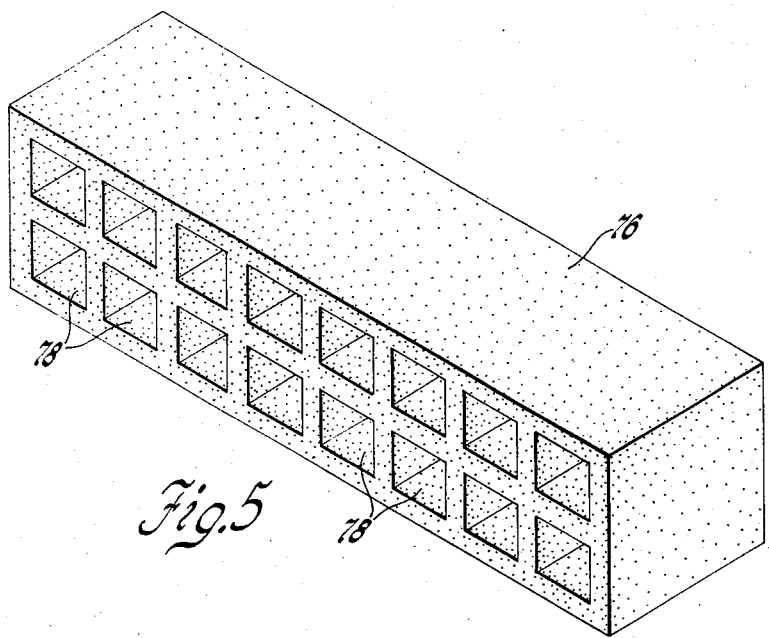
FIG. 5 is an enlarged perspective view of a modified energy absorbing module.

Referring particularly now to FIGS. 2, 3 and 4, the collision bumper system 32 includes a face bar assembly 34 adapted to completely cover the vertical panel 26 as well as the rearward extremities of the left and right quarter assemblies 20 and 22. The face bar assembly includes a face bar 36 having a pair of laterally spaced apertures 38 and 40 therein. A reinforcing channel 42 extends generally the full length of the face bar 36 and is rigidly fastened to the latter by a plurality of bolts 44. The upper flange of the reinforcing channel 42 supports a pair of tail lamp assemblies 46 which are disposed on the channel behind corresponding ones of the apertures 38 and 40 in the face bar 36. A first bracket 48 is rigidly attached to the face bar 36, as by welding, near the top thereof and extends generally the length of the vertical panel 26, the bracket 48 defining a first bearing surface 50 parallel to and in spaced registry with a first reaction surface 52 defined by the vertical panel. Similarly, a second bracket 54 is rigidly attached to the face bar 36 and the channel 42 by a plurality of fasteners 56 and defines a second bearing surface 58 and a third bearing surface 60. The second bearing surface 58 is parallel to and in spaced registry with second reaction surface 62 defined by the vertical panel 26 while the third bearing surface 60 is parallel to and in spaced registry with a third reaction surface 64 defined by the transverse brace 18 of the frame portion 14.

As seen best in FIGS. 3 and 4, the face bar assembly 34 is supported on the vehicle by four steel or fiberglass straps 66. More particularly, the four straps are divided into an upper pair and a lower pair, both the upper and lower pairs extending between the body portion 12 and the face bar assembly. The upper pair of straps converge rearwardly or toward the face bar assembly and are fastened to the latter and to the body portion by a plurality of bolts 68. Similarly, the lower pair of straps converge forwardly or toward the body portion and are fastened to the latter and to the face bar assembly by a plurality of bolts 70.

The straps 66 are relatively thin but define a deep vertical section. Accordingly, each strap exhibits only relatively slight resistance to a force exerted perpendicular to the plane of the strap and, therefore, easily bends or flexes about a vertical axis but exhibits substantial rigidity when subjected to vertical forces. It will be readily apparent, then, that the straps 66 cooperate in supporting the face bar assembly 34 on the body portion for fore and aft bodily shiftable movement while relatively rigidly resisting, in cantilever beam fashion, any tendency of the face bar to move vertically relative to the body portion.

As seen best in FIG. 2, a plurality of energy dissipating or absorbing modules 72 are disposed between respective pairs of bearing and reaction surfaces on the body and the frame portions and on the face bar assembly. The modules are intended to present a predetermined resistance to forward displacement of the face bar 36 when the latter is subjected to an impact thereby to absorb a portion of the energy of the impact, the amount of energy absorbed or dissipated being equal to the magnitude of the predetermined resisting force multiplied by the distance through which the face bar is displaced. The modules, then, must be capable of presenting a predetermined resistance to crush when subjected to compression loading. Further, it is very desirable that the modules 72 be relatively economical to produce and to fabricate into various shapes.

One commonly available material which embodies physical characteristics substantially complementary to the requirements recited hereinbefore is plastic. In particular, polyurethane, polyethylene, and polypropylene are preferred. Each of these plastics is economical, readily available, and adapted for fabrication by conventional molding techniques. Further, each of these plastics can, in addition to typical solid plastic molding, be foamed during molding to substantially reduce the weight per unit volume of the molded object without significantly reducing its ability to present a predetermined resistance to crush under compression loading.

Referring again to FIG. 2, each of the modules 72 thereshown is generally rectangular in cross section and extends transversely the full length of the one of the vertical panel 26 and the brace 18 to which it is attached by conventional techniques such as screws, clips, bonding, or the like. Each of the modules 72 is formed and molded into a homogeneous mass to provide maximum contact area between the module and the bearing and reaction surfaces with minimum added weight. In an alternative embodiment, FIG. 4, a modified module 76, identical in overall dimension to any one of the modules 72, is formed and molded by a process equivalent to that employed in fabricating the modules 72. Modified module 76, however, further includes a plurality of regularly shaped voids 78 which produce a honeycomb pattern. The voids, of course, further reduce the weight of the module and increase economy by reducing the amount of plastic necessary for each module. It has been observed that the honeycomb configuration, FIG. 4, does not significantly effect the energy absorbing capability of the module. A further modified embodiment, not shown, of the modules 72 is structurally similar to the modified module 76 and differs from the latter only in the fact that the foaming step is omitted from the molding operation. Accordingly, the walls of the module defining the honeycomb configuration are solid plastic and the module is somewhat heavier than the modified module 76. Each of the described modules, of course, function identically, as described hereinafter, to dissipate or absorb energy when the face bar 36 is impacted.

Describing now a typical operational sequence of the collision bumper system according to this invention, the face bar assembly 34 is normally maintained spaced from the body and the frame portions 12 and 14 by the modules 72. The straps 66, of course, provide vertical rigidity for the face bar assembly without inhibiting fore and aft bodily shiftable movement of the latter. Therefore, when the face bar assembly is impacted from the rear of the vehicle, the modules 72 are each placed in compression. If the impact is only mild or weak, the modules will rigidly resist movement of the face bar assembly. If, however, the impact is substantial, the modules 72 will crush or collapse between the reaction surfaces and the bearing surfaces while providing a substantially constant resisting force, the resisting force multiplied by the distance through which the face bar is displaced, of course, being the amount of impact energy absorbed.

The modules 72, in addition to absorbing or dissipating a portion of the energy of impact, also function to distribute the force of the impact between the frame and the body portions 12 and 14. More particularly, the relatively large contact area between the modules 72 and the reaction surfaces 52 and 62 on the vertical panel 26 spread a portion of the impact load over a relatively large surface thereby to permit load transfer to relatively thin panel sections which heretofore were unable to withstand impact loading. By thus transferring a portion of the impact load to the body portion of the vehicle, the remaining portion which is transferred to the frame portion at the reaction surface 64 is reduced thereby permitting a reduction in frame weight or, if the frame portion is unchanged, an increase in the overall impact resisting capability of the collision bumper system. Further, the number and placement of the modules with respect to the body and the frame portions determines the proportion of the impact loading which is distributed to each. That is, in the emobdiment shown and described, two modules are disposed between the face bar assembly and the body portion and one module between the face bar assembly and the frame portion so that approximately two-thirds of the impact loading is distributed to the body portion. The exact distribution pattern can, of course, be tailored to meet the needs of the particular vehicle involved.

After the impact ceases the "plastic memory" characteristic of the modules 72, which is inherent in the plastics enumerated hereinbefore, in conjunction with the natural resilience of the straps 66, functions to restore the face bar assembly 34 to its original position. As seen best in FIG. 2, since the straps 66 connect the face bar assembly 34 to the body portion only, a slight deep gap 74 is left between the lowest module 72 and the third bearing surface 60 to foreclose the possibility of fatiguing the lowest module which fatiguing might otherwise occur due to the slight relative vertical movement between the frame and body portions permitted by the resilient body mounts.

Having thus described the invention, what is claimed is:

1. In a collision bumper system for a vehicle including a body portion and an attached frame portion disposed generally below said body portion, the combination comprising, a collision bumper face bar assembly adapted for disposition across generally the entire width of said vehicle, means supporting said face bar assembly on said vehicle in a substantially horizontal altitude for fore and aft bodily shiftable movement relative to said body portion and to said frame portion, means on said face bar assembly defining a plurality of laterally extending bearing surfaces cooperatively extending substantially the entire width of said body portion, means on said body portion and on said frame portion defining a corresponding plurality of laterally extending reaction surfaces cooperatively extending substantially the entire width of each of said body portion and said frame portion, each of said reaction surfaces being parallel to and in spaced registry with a respective one of said bearing surfaces, a plurality of elongated energy absorbing plastic modules adapted to crush under compression force loading while presenting a predetermined resistance to the compression force, and means disposing each of said energy absorbing modules between respective ones of said registered bearing and reaction surfaces to that an impact force on said face bar assembly places each of said modules in substantial compression for energy absorbing crush while said impact force loading is distributed by said modules in predetermined proportion between said body portion and said frame portion.

2. In a collision bumper system for a vehicle including a body portion and an attached frame portion disposed generally below said body portion, the combination comprising, a collision bumper face bar assembly adapted for disposition across generally the entire width of said vehicle, a plurality of support straps disposed between said face bar assembly and said body portion, each of said straps being adapted for fore and aft flexure thereby to support said face bar assembly on said body portion for fore and aft bodily shiftable movement, means on said face bar assembly defining a plurality of laterally extending bearing surfaces, means on said body portion and on said frame portion defining a corresponding plurality of laterally extending reaction surfaces, each of said reaction surfaces being parallel to and in spaced registry with a respective one of said bearing surfaces, a plurality of energy absorbing plastic modules adapted to crush under compression force loading while presenting a predetermined resistance to the compression force, and means disposing each of said energy absorbing modules between respective ones of said registered bearing and reaction surfaces so that an impact force on said face bar assembly places each of said modules in substantial compression for energy absorbing crush while said impact force loading is distributed by said modules in predetermined proportions between said body portion and said frame portion, said reaction surfaces being divided between said body portion and said frame portion such that approximately two-thirds of said impact force loading is distributed to said body portion.

* * * * *